Figure 1:
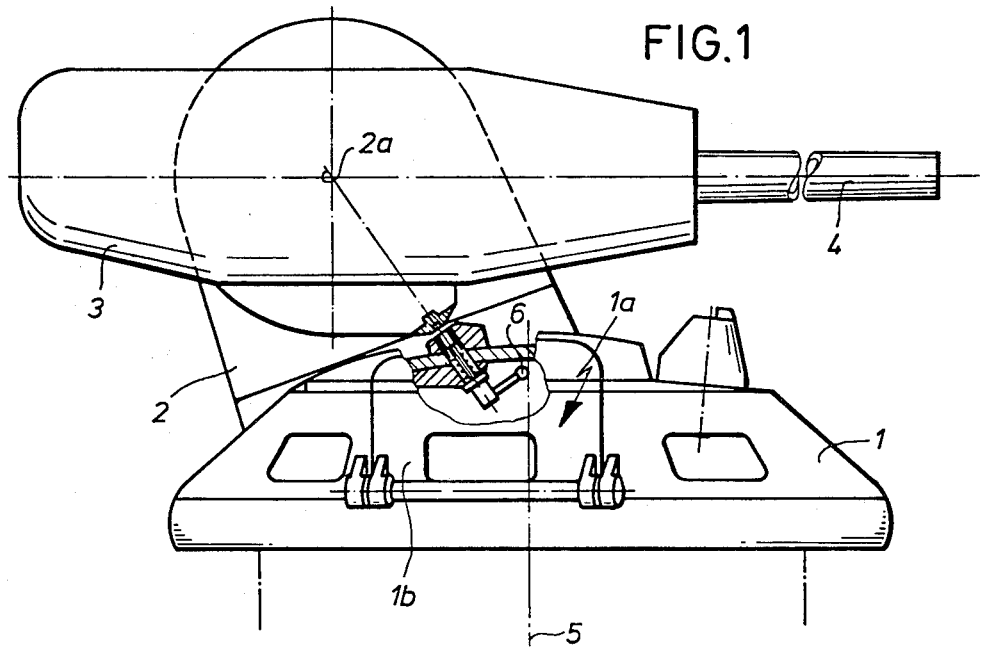

United States Patent [19]

Kaustrater

[11] 4,383,473
[45] May 17, 1983

[54] APPARATUS FOR LOCKING THE SUPPORT OF AN ELEVATIONALLY AIMABLE WEAPON

[75] Inventor: Gert Kaustrater, Augsburg, Fed. Rep. of Germany

[73] Assignee: Industrie-Werke Karlsruhe Augsburg Aktiengesellschaft, Karlsruhe, Fed. Rep. of Germany

[21] Appl. No.: 205,687

[22] Filed: Nov. 10, 1980

Related U.S. Application Data

[63] Continuation-in-part of Ser. No. 97,647, Nov. 27, 1979, Pat. No. 4,336,744.

[30] Foreign Application Priority Data

Nov. 29, 1978 [DE] Fed. Rep. of Germany ....... 2851604

[51] Int. Cl.³ .............................................. F41H 7/02
[52] U.S. Cl. ................................................. 89/40 K
[58] Field of Search ............... 89/36 H, 36 K, 37 H, 89/40 B, 40 K; 340/540

[56] References Cited

U.S. PATENT DOCUMENTS

| 662,761 | 11/1900 | Bowman et al. | 89/36 A |
| 3,424,052 | 1/1969 | Ruf | 89/40 B |
| 3,466,969 | 9/1969 | Stangl et al. | 89/36 K |
| 3,626,367 | 12/1971 | Howard et al. | 340/540 |

OTHER PUBLICATIONS p. 31 from West German Army Technical Service Manual TDv1005/027-12.

Primary Examiner—Stephen C. Bentley
Attorney, Agent, or Firm—Barnes & Thornburg

[57] ABSTRACT

An apparatus for locking a weapon support in either a zero position or any weapon-firing position relative to the turret of an armored vehicle. The apparatus includes a bore formed in the weapon support, a casing provided in the turret, and a bolt which engages the bore and protrudes through the casing into the interior of the armored vehicle. The bolt is spring-biased axially into engagement with the bore and the casing includes a gate. The bolt includes an index pin which engages the gate, the gate having first, second, and third defined positions for the index pin for latching and unlatching the weapon support.

6 Claims, 5 Drawing Figures

U.S. Patent  May 17, 1983  Sheet 1 of 2  4,383,473

APPARATUS FOR LOCKING THE SUPPORT OF AN ELEVATIONALLY AIMABLE WEAPON

This is a continuation-in-part of my co-pending U.S. Pat. No. application Ser. No. 97,647, filed Nov. 27, 1979, now U.S. Pat. No. 4,336,744 issued June 29, 1982.

Device for Locking the Support, Swiveling on a Lying Axis of Rotation, of an Elevationally Aimable Weapon, for Instance a Rapid-Fire Gun.

The invention concerns a device for locking a support, swiveling on a lying axis of rotation, of an elevationally trainable weapon, for instance a rapid-fire gun, relative to a part supporting it on the outside, of a turret swivelable in a vehicle on a vertical axis of rotation, said device consisting of a bore and bolt on whose free end there is a handle attached which permits about 180° of swivel, is axially movable under spring pressure and follows a helical path in a casing surrounding the bolt.

The vehicle concerned may be an armored wheel, half-track or full-track vehicle with a full-circle swivelable turret. The locking device makes it possible to selectively secure the weapon in the zero position ("tied position") of the weapon support or move it in any firing position.

Irrespective of the combat case, armored wheel, half-track or full-track vehicles are alone for terrain-related reasons subjected to considerable mechanical stresses. Such stresses require for instance a safe storage arrangement of the ammunition for the on-board weapons in the vehicle interior.

This applies equally to the on-board weapon(s), specifically to a rapid-fire gun pertaining to the vehicle: It requires both for off the road and on the road travel a careful and safe securing in its zero or "tied position". On the other hand, however, for instance with impending weapon use, it must be assured that the on-board weapon will be within the shortest possible time in firing readiness. In turn, this makes it necessary that the fixing of the weapon in the zero or "tied position" can be eliminated as quickly as possible.

The initially mentioned locking device has the shortcoming that due to its arrangement on the outside of the vehicle and/or vehicle turret it can only from there be rendered operational or nonoperational. For this purpose it is necessary that a crew member available himself outside the armor protection provided by the vehicle and the turret. The hazard which of necessity results thereof for the soldier operating the locking device is to be viewed as a considerable disadvantage.

The problem underlying the invention is to provide a locking device of the above type which permits the crew member operating the device to no longer leave the armor protection and which, moreover, effects the locking in a particularly simple, quick and unproblematic manner, without requiring visual observation of the exactly corresponding position of the bore and bolt pairing.

This problem is inventionally solved in that the bore is arranged in the weapon support while the bolt housing is located in the turret hood and protrudes into its interior, and in that, moreover, the helical path is contained in a gate which between the limit, engagement positions for locking and unlocking features an intermediate engagement position for the bolt for running it during the weapon support swivel onto faces which flank the bore in the weapon support in the engagement area of the bolt, with the axial movement generated upon run-on of the bolt surmounting the spring pressure and permitting forced control of an index pin firmly connected with it into the locking position by the gate.

Since the bolt casing is located in the turret hood and protrudes into its interior, with the gate also arranged inside the turret hood, the soldier operating the locking device is no longer endangered in the sense explained above, irrespective of whether a locking or unlocking action is intended. For unlocking, the device needs to be moved, according to the inventional design, only into the intermediate locking position for the bolt. As soon as the weapon is lowered or raised and the bolt encounters during the weapon support swivel one or the other run-on face, an axial bolt movement is of necessity generated which is transmitted also to the index pin firmly connected with it. The index pin is force-controlled into the locking position by the gate. Obtained without further assistance of the person responsible for the locking device is thus a very simple, quick and unproblematic locking in blind action.

Rigidly connected with the bolt is favorably an arm which in the locking position runs on a signal head fastened on the turret, thereby signaling its proper arrival in the locking position.

Moreover, bore and bolt have suitably a slightly conic design in order to additionally facilitate the automatic latching in that at the beginning of it the end surface of the bolt has a smaller diameter than the entrance opening of the bore opposite the end surface of the bolt. When mated, this provides the further advantage of a latching without play, which is still effective also in the presence of wear phenomena.

The gate features an inclined, forced control surface which is located axially opposite the intermediate latching position and swivels the index pin during its axial movement in the direction toward the latching position. As soon as the bolt can under spring pressure engage the bore, it moves axially again in opposite direction whereby the index pin proceeds into the limit, latching position for the locking. These movements take place completely automatically.

The invention and its favorable design will be more fully explained hereafter with the aid of an embodiment illustrated in the drawing.

Figure 2:
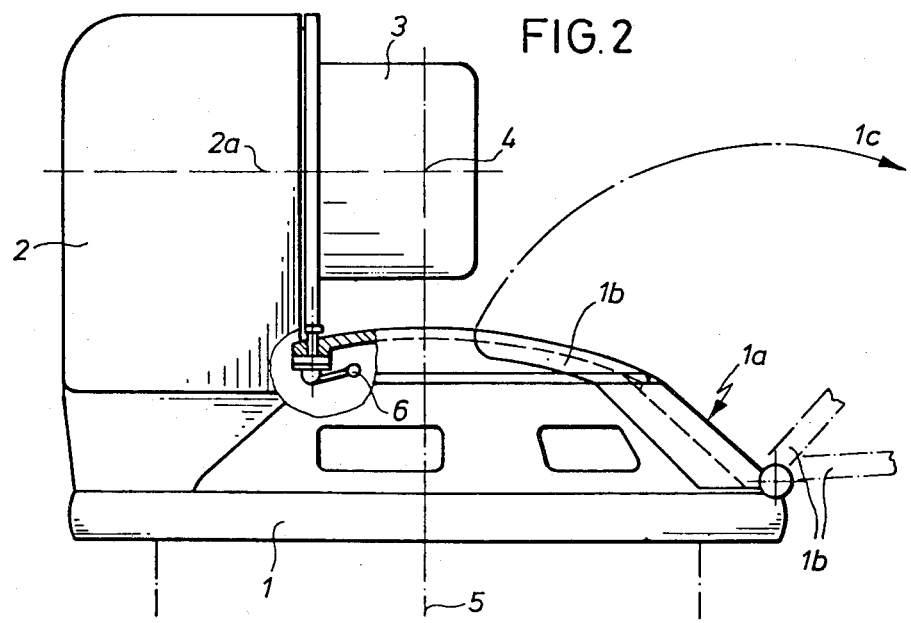
Figure 3:
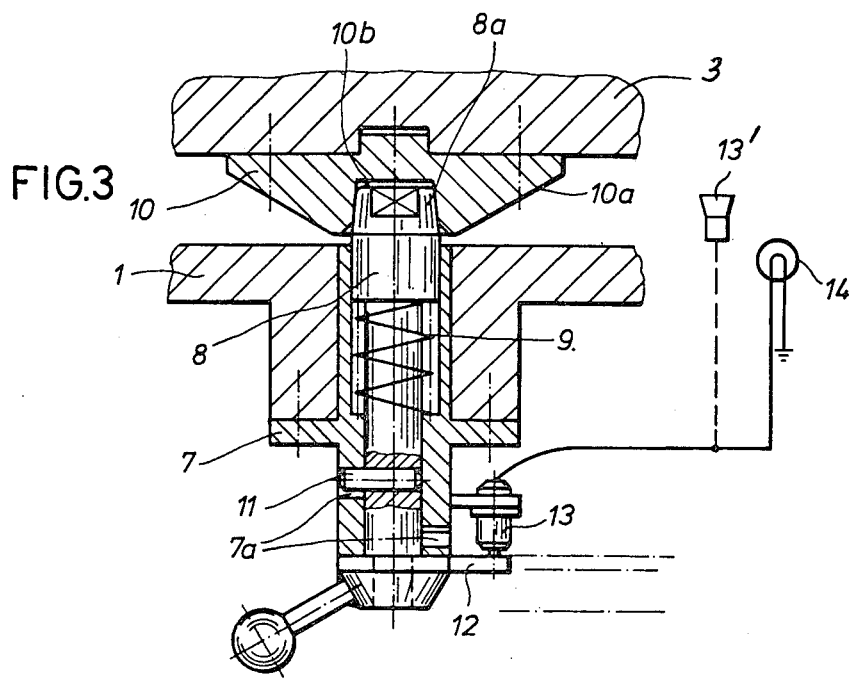
Figure 4:
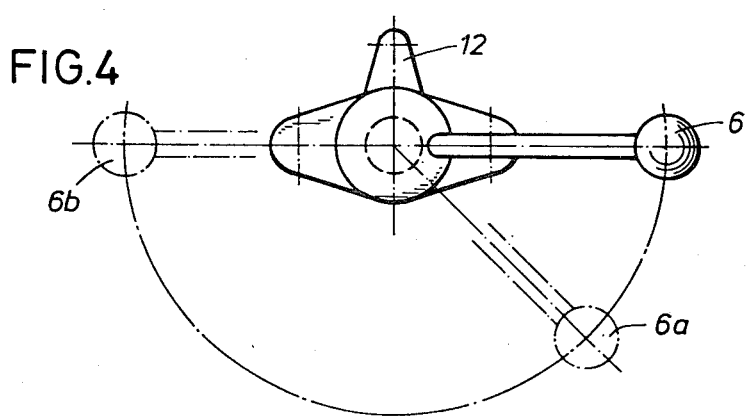
Figure 5:
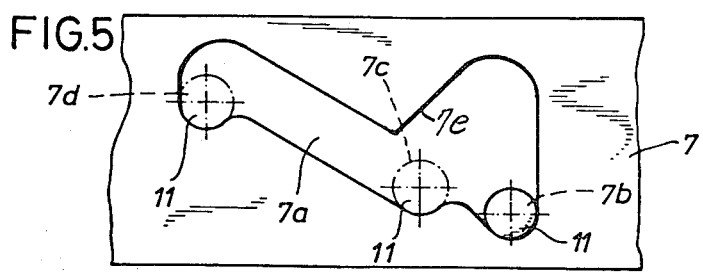

FIG. 1 shows the turret of an armored vehicle—not illustrated in detail—with weapon support and rapid-fire gun in side elevation;

FIG. 2, the turret relative to FIG. 1, from the rear, that is, in the direction of travel;

FIG. 3, a vertical section through the latching device serving to fix or release the weapon support;

FIG. 4, a sketch of the switching positions of the turnable handle of the device relative to FIG. 3, and lastly FIG. 5, a gate type guide fashioned as a forced control with defined latching positions.

Arranged on a wheel, half-track or full-track vehicle—not illustrated—is a turret 1 in customary fashion, permitting it to swivel around an upright axis of rotation 5. Rigidly connected with the turret 1, on its outside, is a weapon standard 2 on which a weapon support 3 is mounted in a fashion permitting elevational training around a horizontal axis of rotation 2a. Arranged on the weapon support 3 is an on-board weapon, for instance a rapid-fire gun 4. In order to home in on a target, the sideways training of the weapon, consequently, takes place by swiveling the turret 1 around its upright axis of rotation 5. Elevational training of the weapon is accomplished by swiveling the weapon support 3 which on the weapon standard 2 swivels on the horizontal axis 2a. A hatch 1a arranged in the direction of travel on the far side of the weapon standard 2 can be closed by means of a hatch cover 1b; the opening radius of the cover 1b is symbolized by arrow 1c (FIG. 2).

The device for latching the weapon support 3 relative to the weapon standard 2 and/or the turret 1 consists of a bore 10b and a bolt 8 to the free end of which there is attached a turning handle 6 which can be rotated about 180°, is axially movable under the pressure of the spring 9 and runs lengthwise in a helical track contained in a housing 7 which surrounds the bolt.

The bore 10b is inventionally arranged in the weapon support 3. The bolt housing 7 is located in the hood of the turret 1 and protrudes into its interior. The helical track is contained also in a gate 7a (refer to FIGS. 3 and 5) which features between the limit latching positions 7b, for locking, and 7d, for unlocking, an intermediate latching position 7c (for) the bolt 8 to run onto run-on surfaces 10a as the weapon support swivels, which run-on surfaces flank the bore 10b in the weapon support 3 in the engagement area of the bolt 8. With the illustrated, preferred embodiment the run-on surfaces 10a are provided on a locking bar 10 which is fastened on the weapon support 3. The axial movement generated by the run-on of the bolt 8 surmounts the pressure spring 9 and causes an index pin 11 which is rigidly connected with it to be force-controlled by the gate 7a into the latching position 7b.

The index pin 11 is arranged transverse to the bolt 8 and runs in the fashion deriving from FIGS. 3 and 5 in the gate 7a of the bolt casing 7. Illustrated in FIG. 4, for one, is the turning handle 6 and in FIG. 5, for another, the index pin 11, each in its three defined latching positions, with the corresponding positions 6 and 7b serving the blocking and/or tying, the positions 6a and 7c the partial unlatching and/or untying (so-called intermediate latching position) and, lastly, the positions 6b and 7d the unlatching and/or untying of the bolt 8, which on its upper end 8a is of a slightly conic design, relative to the recess 10b which is appropriately fashioned and arranged in the locking bar.

On the illustrated, preferred embodiment the gate 7a features an inclined forced-control face 7e which axially is located opposite the intermediate latching position 7c. When it is desired to move the inventional device into latching position, in which the index pin 11 will be in position 7b, the soldier operating the latching device only needs to move the turning handle 6 from the position 6b (FIG. 4), which corresponds to the unlatching position 7d of the index pin 11, to the position 6a, which corresponds to the partial unlatching position 7c of the index pin 11. In this context, it is pointed out that the top edge of gate 7a, in FIG. 5, is relative to FIG. 3 turned upside down, whereas the bottom edge of the gate is turned up. When now swiveling the weapon support 3 for latching purposes around the horizontal axis of rotation 2a in order to cause the bore 10b and the cone 8a of the bolt 8 to engage, either one or the other run-on faces 10a of the locking bar 10, depending on whether the weapon support 3 is turned up or down, runs onto the cone 8a which in the intermediate latching position 7c protrudes a certain length above the surface of the turret 1. Created thereby is of necessity an axial downward movement of the bolt 8 in FIG. 3 against the force of the helical compression spring 9, which force is transmitted to the index pin 11. As a result, the index pin 11 strikes the forced-control face 7e and is being turned as the bolt 8 continues its axial movement in the direction toward the latching position 7b, shown in FIG. 5, that is, to the right. As soon as the bolt 8 and/or its cone 8a engages the bore 10b and is thus permitted to move under the effect of the helical compression spring 9 axially in opposite direction, the index pin 11 moves also in the appropriate direction and latches positively, according to FIG. 5, in the position illustrated by solid lines. Both the bolt 8 and the index pin 11 are held in this latching position 7b through the effect of the helical compression spring 9.

The invention assures thus a very simple, quick and unproblematic latching, so to speak, in blind operation, without requiring the soldier operating the latching device to do more than moving the turning handled 6 from the position 6b, which corresponds with the unlatching position 7d of the index pin 11, into position 6a, which corresponds with the intermediate latching position 7c of the index pin 11.

Rigidly connected with the bolt 8 is suitably an arm 12 which in the latching position 7b runs on a turret-mounted signal button 13 and signals the proper latching by means of an acoustic and/or optical signal 13', 14 which indicates to the commander or the gunner, that the weapon support 3 with the rapid-fire gun 4 is latched and/or tied. In the opposite case, when the acoustic signal ceases or the optical indication turns off, the crew is able to recognize that the mechanical blocking between turret 1 and weapon support 3 has been eliminated and/or is in the partial unlatching position.

When the rapid-fire gun 4 is to be readied for firing from the latching position 7b, the turning handle 6 is moved to the position 6b in which the index pin 11 is located again in the unlatching position 7d. The cone 8a of bolt 8 disengages through the resulting axial shift the bore 10b of the locking bar 10. The necessary downward, axial movement against the force of the helical spring 9 surrounding the shaft of the bolt 8, in FIG. 3, is controlled obviously by the index pin 11 which runs in the gate 7a and moves into unlatching position 7d.

For the sake of completeness it is pointed out that the illustration in FIG. 5, naturally, represents a roll-off of the gate 7a, which according to FIG. 3 extends down the wall of the bolt casing 7 and, thus, in its peripheral direction.

Also, it is pointed out that it would be possible, as the case may be, to make do without a separate turning handle 6 and, instead, make the index pin 11 sufficiently long to serve as an operating handle.

I claim:

1. An apparatus for securing and releasing a weapon support of an armored vehicle from inside the turret of the vehicle, comprising a casing fixed in the turret and forming a guideway communicating with the exterior and interior of the turret, a bolt axially received in the guideway having one end exterior to the turret, a handle connected to the other end of the bolt interior to the turret for rotating the bolt about 180° within the guideway, a bore in the weapon support for receiving the one end of the bolt, a spring axially biasing the one end of the bolt into engagement with the bore, an index pin connected to the bolt and extending transverse to the axis of the bolt, a gate in the casing for receiving the index pin, the gate including a helical track and a guide surface opposite the track for engaging the index pin in response to axial movement of the bolt, the index pin communicating with the track and being movable between latching, unlatching, and intermediate latching positions when the bolt is rotated in the casing, and run-on surfaces on the weapon support adjacent to the bore, the one end of the bolt engaging the run-on surfaces when the index pin is in the intermediate latching position whereby swivel movement of the weapon support causes the run-on surfaces to axially move the bolt against the force of the spring and the guide surface to guide the pin into the latching position.

2. The apparatus as recited in claim 1, further comprising an arm (12) rigidly connected to the bolt which in the latching position strikes on a turret-mounted signal button (13).

3. The apparatus as recited in claim 1 or 2, wherein the bore (10b) and the one end of the bolt (8) are slighltly conic (8a).

4. The apparatus as recited in claim 1 wherein the guide surface includes an inclined forced-control face (7e) which is located axially opposite the intermediate latching position (7c) for engaging and guiding the pin into the latching position.

5. An apparatus for securing and releasing a weapon support of an armored vehicle from inside the turret of the vehicle, comprising a casing fixed in the turret and forming a guideway communicating with the exterior and interior of the turret, a bolt axially received in the guideway having one end exterior to the turret which is slightly conic, a handle connected to the other end of the bolt interior to the turret for rotating the bolt within the guideway, a locking bar fixed to the weapon support, the locking bar including a bore for receiving the conic end of the bolt, means for biasing the conic end of the bolt into engagement with the bore of the locking bar, and an index pin connected to and positioned transverse to the longitudinal axis of the bolt, the casing including a helical track, the index pin communicating with the track and being movable between latching, unlatching, and intermediate latching positions when the bolt is rotated in the casing, the track including an inclined control surface opposite the intermediate latching position for engaging the index pin in response to axial movement of the bolt to guide the pin into the latching position.

6. The apparatus as recited in claim 5 wherein the locking bar includes run-on surfaces on both sides of the bore which in response to swivel movement of the weapon support engage the conic end of the bolt when the pin is in the intermediate latching position to axially move the bolt against the force of the biasing means and thereby move the pin into the latching position.

* * * * *